United States Patent Office 3,242,229
Patented Mar. 22, 1966

3,242,229
HYDROCARBON CONVERSION PROCESS
John H. Estes, Wappingers Falls, N.Y., assignor to Texaco Inc., New York, N.Y., a corporation of Delaware
No Drawing. Original application May 17, 1963, Ser. No. 281,358. Divided and this application Jan. 13, 1965, Ser. No. 425,347
6 Claims. (Cl. 260—683.68)

This application is a division of copending application Serial No. 281,358 filed May 17, 1963, now abandoned.

This invention relates to a hydrocarbon conversion process and more particularly to a process for the conversion of mixtures of hydrocarbons to highly branched hydrocarbon products. In accordance with the process of this invention, hydrogen and a mixture comprising an isomerizable hydrocarbon containing at most six carbon atoms and another hydrocarbon containing at least seven carbon atoms are contacted at conversion conditions with a catalyst comprising a chloride activated platinized alumina. Hydrocarbon conversion conditions include a temperature within the range of about 200 to 400° F., a liquid hourly space velocity within the range of about 0.5 to about 2.0 and a hydrogen to hydrocarbon mol ratio within the range of about 0.10:1 to 5.0:1. The chloride activated platinized alumina is prepared by compositing platinum with alumina and activating the composite by contacting with a chloride activating agent having an atomic ratio of chlorine to carbon of at least 2 to 1 at a temperature within the range of about 300 to 650° F.

Highly active isomerization catalysts prepared by the activation of a platinized alumina composite with a chlorohydrocarbon or an acid chloride are described in application S.N. 102,668 and application S.N. 102,641 both filed April 13, 1961. These catalysts are prepared by adding platinum to eta or gamma alumina in an amount within the range of about 0.01 to about 1.0 weight percent of the alumina. The platinum is added by any of various well known methods including, for example, impregnation with a water-soluble platinum containing compound such as chloroplatinic acid, or precipitation of platinum as sulfide by passing hydrogen sulfide through an aqueous solution of a platinum compound. The platinum-alumina composite is then activated by treatment with a chloride activating agent under conditions effective to react at least a portion of said activating agent with at least one component of said composite. The platinum-alumina composite is contacted with a chloride activating agent in an amount within the range of about 3.0 to 15.0 percent by weight of the platinum-alumina composite. The chloride platinum-alumina mixture is activated at a temperature of at least 300° F. and preferably within the range of about 300 to 650° F. The duration of the activation step and the rate of heating do not appear critical so long as control is maintained and uniform conditions are achieved. The catalyst thus prepared has a high activity for the isomerization of hydrocarbons, for example, butane, normal pentane and hexanes, and gasoline hydrocarbon fractions. The activated catalyst prepared in accordance with this method may be in pellet, granular, bead, or pulverulent form to facilitate its use in fixed beds, moving beds, or fluidized solids beds as is well known in the art.

Chloride activated platinized alumina catalyst may be stabilized and its activity further enhanced by the heat-treatment described in copending application S.N. 242,886 filed December 7, 1962. In this method of heat-treatment, the chloride activating agent remaining in contact with the activated catalyst is displaced and the activated catalyst is heated to a temperature within the range of about 400 to 1,000° F. The heat-treatment is continued for a period of about 2 to 10 hours. During this heat-treatment, gases are evolved from the catalyst comprising predominantly hydrogen chloride together with minor amounts of carbon dioxide and other acidic gases.

This chloride activated isomerization catalyst is highly active at relatively low temperatures. Gasoline fractions, for example, light straight run gasoline and natural gasoline, are treated at temperatures of about 200 to 350° F. and preferably within the range of about 280 to 300° F. Hydrocarbon streams consisting chiefly of pentanes and hexanes are isomerized at temperatures within the range of about 250 to 350° F. and preferably within the range of about 280 to 300° F. Butane isomerization is effected at temperatures within the range of 300 to 400° F. and preferably within the range of 315 to 350° F. Isomerization may be effected in either the liquid or vapor phase. Pressure has been found to have little effect in my process, other than determining whether liquid or vapor phase conditions prevail, and pressures within the range of 300 to 500 pounds per square inch gauge have been found convenient. A liquid hourly space velocity, that is the volume of liquid charged per hour per volume of catalyst, within the range of about 0.5 to 2.0 and preferably within the range of about 0.75 to 1.5 is employed. Hydrogen is included in the isomerization feed in a mol ratio of hydrogen to hydrocarbon within the range of about 0.10:1 to 5:1 and preferably within the range of about 2:1 to 4:1 for hexanes and pentanes and 0.1:1 to 1:1 for butanes.

I have found that, in the treatment of substantially pure normal heptane with the chloride activated platinized alumina catalyst, a substantial amount of cracking to highly branched saturated lower boiling hydrocarbons accompanies isomerization. In the case of hydrocarbons higher boiling than heptanes, isomerization is accompanied by almost complete conversion to highly branched saturated lower boiling products. The combined reaction of cracking and hydrogenation forming these saturated lower boiling products, referred to hereinafter as hydrocracking, results in the liberation of exothermic heat. This liberated heat tends to raise the reaction temperature thereby accelerating the rate of cracking. I have discovered that temperature control may be provided by inclusion of an isomerizable hydrocarbon containing at most six carbon atoms in feed stocks containing at least seven carbon atoms. This method not only provides a means of absorbing the exothermic heat of hydrocracking without substantial temperature rise, but additionally results in the conversion of the isomerizable hydrocarbon to highly branched isomeric products. Hydrocarbons containing at most six carbon atoms are not cracked but are converted to highly branched isomers of the same chain length. Surprisingly in the case of normal heptane, the inclusion of an isomerizable hydrocarbon containing at most six carbon atoms suppresses the cracking reaction so that relatively large yields of isomeric heptanes are produced. In accordance with my process, at least 30 percent isomerizable hydrocarbons containing at most six carbon atoms are employed with mixtures of hydrocarbons containing at least seven carbon atoms. As much as 90.0 weight percent isomerizable hydrocarbon may be employed to absorb the heat of hydrocracking and suppress the cracking reaction. Isomerizable hydrocarbons containing at most six carbon atoms which may be employed in the process of this invention include, for example, butanes, pentanes, hexanes and cyclics such as methylcyclopentane. Hydrocarbons containing at least seven carbon atoms which may be employed in the process of this invention include, for example, heptanes, octanes, nonanes, decanes and cyclics such as methylcyclohexane.

*Example A*

An eta alumina catalyst base is prepared by heating beta alumina trihydrate for two hours at 1,000° F. The eta alumina catalyst base is admixed with an aqueous solution of chloroplatinic acid, dried and calcined for a period of two hours at 1,050° F. forming a platinized alumina composite containing 0.5 weight percent platinum. The platinized alumina is contacted with carbon tetrachloride vapor employing one part by weight of carbon tetrachloride to ten parts of platinized alumina. The carbon tetrachloride and platinized alumina are heated to a temperature of 500° F. over a period of two hours and held at this temperature for an additional two hours in a closed vessel. The resulting activated alumina has a chlorine content of 7.9 weight percent. Normal heptane is contacted with the chloride activated platinized alumina catalyst at 350° F., 300 p.s.i.g., a 1.0 liquid hourly space velocity and with a hydrogen to hydrocarbon mol ratio of 3 to 1. A highly exothermic reaction is observed and the effluent product is found to consist almost exclusively of butanes and propanes. No liquid product is recovered and no carbon formation on the catalyst is observed.

*Example B*

A liquid mixture comprising 50 percent normal hexane and 50 percent normal heptane is contacted with the catalyst of Example A at 350 p.s.i.g., 250° F., 1.0 liquid hourly space velocity, and at a 3 to 1 hydrogen to hydrocarbon mol ratio. Liquid and gaseous products are recovered having the following composition by weight:

Propane ------------------------------------ 2.4
Isobutane ---------------------------------- 9.6
Isopentane --------------------------------- 0.2
2,2-dimethylbutane ------------------------- 20.5
2,3-dimethylbutane and 2-methylpentane ----- 31.5
3-methylpentane ---------------------------- 13.3
Normal hexane ------------------------------ 7.5
Methylcyclopentane ------------------------- 1.1
2,3,3-trimethylbutanes, 2,4-dimethylpentane and 2,2-dimethylpentane ------------------------ 4.6
Cyclohexane, and 3,3-dimethylpentane ------- 2.2
2,3-dimethylpentane and 2-methylhexane ----- 3.7
3-methylhexane ----------------------------- 2.4
3-ethylpentane ----------------------------- 0.1
Normal heptane ----------------------------- 0.8

Although about 12 percent of the products are products of cracking, the exothermic heat of hydrocracking had no significant effect upon the reaction temperature maintained. No carbon formation on the catalyst is observed.

*Example C*

A feed stock comprising 70% normal butane and 30% normal octane is contacted with the catalyst of Example A at a pressure of 300 p.s.i.g., a temperature of 250° F., a 1.0 liquid hourly space velocity and with a hydrogen to hydrocarbon mol ratio of 3.2. A liquid yield of 86.5 volume percent is obtained having the following composition in weight percent:

Propane ------------------------------------ 0.6
Isobutane ---------------------------------- 14.4
Normal butane ------------------------------ 2.2
Isopentane --------------------------------- 2.6
2,2-dimethylbutane ------------------------- 8.1
2,3-dimethylbutane and 2-methylpentane ----- 34.6
3-methylpentane ---------------------------- 14.4
Normal hexane ------------------------------ 18.2
Methylcyclopentane ------------------------- 1.1
Cyclohexane -------------------------------- 1.4
Normal heptane ----------------------------- 0.3

No carbon is formed on the catalyst.

*Example D*

A charge stock of 30 percent normal octane and 70 percent normal hexane and another charge stock of 10 percent normal cetane and 90 percent normal hexane are contacted with the catalyst of Example A at 300 p.s.i.g., 250° F., 1.0 liquid hourly space velocity with a hydrogen to hydrocarbon mol ratio of 3 to 1 with the following results:

| Product | 30% N Octane, 70% N Hexane, wt. percent | 10% N Cetane, 90% N Hexane, wt. percent |
|---|---|---|
| Methane and Ethane | 3.8 | 0.5 |
| Propane | 0.8 | 0.5 |
| Isobutane | 15.7 | 3.2 |
| Normal Butane | 1.7 | 0.2 |
| Isopentane | 2.8 | 3.0 |
| Normal Pentane | 0.2 | 0.5 |
| 2,2-Dimethylbutane | 10.0 | 20.0 |
| 2,3-Dimethylbutane and 2-Methylpentane | 33.3 | 40.0 |
| 3-Methylpentane | 14.0 | 16.4 |
| Normal Hexane | 15.1 | 12.0 |
| Methylcyclopentane | 0.1 | 1.4 |
| Cyclohexane | 1.4 | 1.8 |
| Heptanes and heavier | 0.2 | 0.5 |

No carbon formation on the catalyst is observed.

I claim:

1. A hydrocarbon conversion process which comprises contacting hydrogen and a mixture comprising an isomerizable hydrocarbon containing at most six carbon atoms and another hydrocarbon containing at least seven carbon atoms at a temperature within the range of about 200 to 400° F., a liquid hourly space velocity within the range of about 0.5 to 2.0 and a hydrogen to hydrocarbon mol ratio within the range of about 0.10:1 to 5.0:1 with a catalyst consisting essentially of alumina, platinum, and chlorine wherein at least a part of said chlorine is introduced into said catalyst by contacting a composite of platinum and alumina with a chloride activating agent having an atomic ratio of chlorine to carbon of at least 2 to 1 at a temperature within the range of about 300 to 650° F., in the substantial absence of carbon deposition on said catalyst whereby said hydrocarbon containing at least seven carbon atoms is cracked to lower boiling hydrocarbons.

2. The method of claim 1 wherein said mixture comprises within the range of 30.0 to 90.0 weight percent isomerizable hydrocarbon containing at most 6 carbon atoms.

3. The method of claim 2 wherein said isomerizable hydrocarbon is normal hexane.

4. The method of claim 1 wherein said another hydrocarbon is normal heptane.

5. The method of claim 1 wherein said another hydrocarbon contains 8 to 10 carbon atoms.

6. The method of claim 2 wherein said isomerizable hydrocarbon is normal butane.

References Cited by the Examiner

UNITED STATES PATENTS 2,871,277   1/1959   Haensel ----------- 208—139
2,915,571   12/1959  Haensel ----------- 260—683.68
3,159,564   12/1964  Kelley et al. ------ 208—254
3,172,834   3/1965   Kozlowski --------- 260—683.3
3,172,839   3/1965   Kozlowski --------- 208—143

FOREIGN PATENTS 1,299,388   6/1962   France.

DELBERT E. GANTZ, *Primary Examiner.*